US012580444B2

(12) United States Patent
Yokoyama

(10) Patent No.: US 12,580,444 B2
(45) Date of Patent: Mar. 17, 2026

(54) COMPONENT

(71) Applicant: JATCO Ltd, Fuji (JP)

(72) Inventor: Kazuhiko Yokoyama, Fuji (JP)

(73) Assignee: JATCO Ltd, Fuji (JP)

( * ) Notice: Subject to any disclaimer, the term of this patent is extended or adjusted under 35 U.S.C. 154(b) by 278 days.

(21) Appl. No.: 18/547,045

(22) PCT Filed: Feb. 22, 2022

(86) PCT No.: PCT/JP2022/007148
§ 371 (c)(1),
(2) Date: Aug. 18, 2023

(87) PCT Pub. No.: WO2022/190849
PCT Pub. Date: Sep. 15, 2022

(65) Prior Publication Data
US 2024/0128830 A1     Apr. 18, 2024

(30) Foreign Application Priority Data

Mar. 9, 2021     (JP) ................................. 2021-037139

(51) Int. Cl.
*H02K 5/22* (2006.01)
*H02K 7/116* (2006.01)
*H02K 9/19* (2006.01)
*H02K 11/33* (2016.01)

(52) U.S. Cl.
CPC ................. *H02K 5/22* (2013.01); *H02K 9/19* (2013.01); *H02K 11/33* (2016.01); *H02K 7/116* (2013.01)

(58) Field of Classification Search
CPC .......... H02K 11/33; H02K 5/203; H02K 5/22; H02K 7/083; H02K 7/116; H02K 9/19; H02M 1/327; H02M 7/003
See application file for complete search history.

(56) References Cited

U.S. PATENT DOCUMENTS

| | | | |
|---|---|---|---|
| 10,879,770 B2 | 12/2020 | Sakurada | |
| 2004/0163409 A1 | 8/2004 | Nakajima et al. | |
| 2017/0294821 A1 | 10/2017 | Shimizu et al. | |
| 2019/0297751 A1* | 9/2019 | Okuhata | H02K 9/197 |
| 2020/0106325 A1 | 4/2020 | Okuhata | |
| 2023/0407869 A1* | 12/2023 | Daussin | F04C 29/0021 |

FOREIGN PATENT DOCUMENTS

| | | |
|---|---|---|
| JP | 2004-260898 A | 9/2004 |
| JP | 2009-044922 A | 2/2009 |
| JP | 2010-268633 A | 11/2010 |
| JP | 2016-171642 A | 9/2016 |

(Continued)

*Primary Examiner* — Christopher M Koehler
*Assistant Examiner* — Ethan Nguyen Vo
(74) *Attorney, Agent, or Firm* — Foley & Lardner LLP

(57) ABSTRACT

A component comprising: a motor accommodating portion that accommodates a motor; an inverter accommodating portion that accommodates an inverter; a coupling portion that couples the motor accommodating portion and the inverter accommodating portion and is integrally formed with the motor accommodating portion and the inverter accommodating portion; and an oil passage that is formed in the coupling portion in a manner of extending along an axial direction of the motor.

6 Claims, 3 Drawing Sheets

(56) References Cited

FOREIGN PATENT DOCUMENTS

| | | | |
|---|---|---|---|
| JP | 2019-140786 | A | 8/2019 |
| JP | 2019-154208 | A | 9/2019 |
| JP | 2020-054185 | A | 4/2020 |
| JP | 2020-089170 | A | 6/2020 |
| WO | WO-2016/051535 | A1 | 4/2016 |
| WO | WO-2019/159240 | A1 | 8/2019 |

* cited by examiner

COMPONENT

TECHNICAL FIELD

The present invention relates to a component.

BACKGROUND ART

Patent Document 1 discloses a motor drive unit including a motor, an inverter, a motor housing that accommodates the motor, and a casing that accommodates the inverter.

PRIOR ART DOCUMENT

Patent Document

Patent Document 1: JP 2020-54185 A

SUMMARY OF INVENTION

In the motor drive unit (hereinafter, simply referred to as a drive unit) disclosed in Patent Document 1, an oil passage that allows both axial ends of the motor to communicate with each other is not provided. Further, it is usually conceivable to provide a communication oil passage on an outer peripheral side of the motor housing. However, when the communication oil passage is provided on the outer peripheral side of the motor housing, there is a problem that a size of the drive unit increases.

The present invention has been made in view of such a problem, and an object thereof is to achieve a decrease in size and weight by providing an oil passage that allows both axial ends of a motor to communicate with each other.

According to one aspect of the present invention, a component comprising: a motor accommodating portion that accommodates a motor; an inverter accommodating portion that accommodates an inverter; a coupling portion that couples the motor accommodating portion and the inverter accommodating portion and is integrally formed with the motor accommodating portion and the inverter accommodating portion; and an oil passage that is formed in the coupling portion in a manner of extending along an axial direction of the motor.

According to an aspect of the present invention, it is possible to achieve a decrease in size and weight by providing an oil passage that allows both axial ends of a motor to communicate with each other.

DESCRIPTION OF EMBODIMENTS

Figure 1:
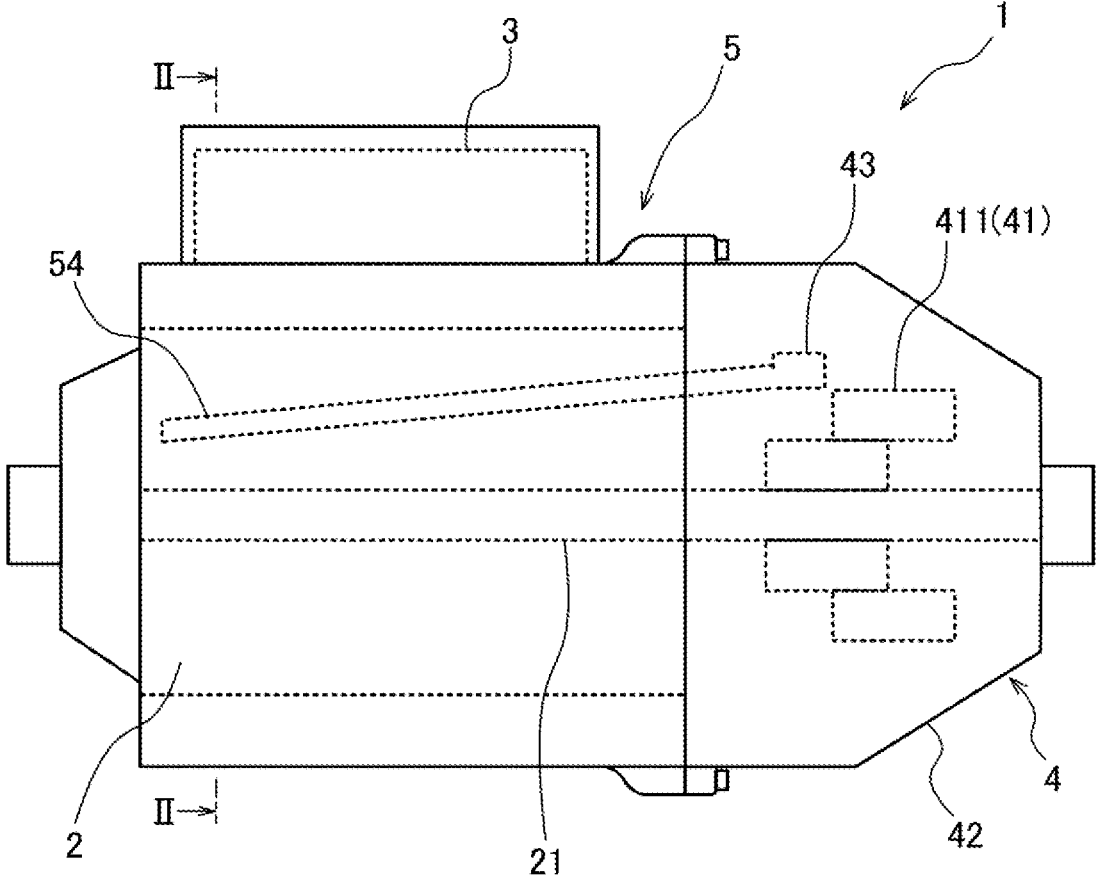
FIG. 1 is a schematic side view showing a drive unit according to the present embodiment.

Hereinafter, an embodiment of the present invention (hereinafter, simply referred to as the present embodiment) will be described with reference to the accompanying drawings.
(Configuration of Drive Unit)
First, a drive unit 1 according to the present embodiment will be described with reference to FIG. 1. In the present specification, the same elements are denoted by the same reference numerals throughout the drawings.

FIG. 1 is a schematic side view showing the drive unit 1 according to the present embodiment.

The drive unit 1 according to the present embodiment is used for driving a driving wheel (not shown) of a vehicle, but is not limited thereto, and may be used for driving an electrical appliance, for example. As shown in FIG. 1, the drive unit 1 includes a motor 2, an inverter 3, a gear box 4, and a housing member 5. A component includes, for example, the housing member 5 alone, or a vehicle component including the housing member 5, but is not limited thereto. Examples of the vehicle component include, for example, a drive device that drives a vehicle, but are not limited thereto.

The motor 2 is a drive source that outputs a driving force (that is, a rotational force) to the gear box 4. The motor 2 is provided in a cylindrical shape. Further, the motor 2 is provided such that a rotating shaft 21 extends along a longitudinal direction of the drive unit 1. That is, an axial direction of the shaft 21 coincides with the longitudinal direction of the drive unit 1. A rear end of the shaft 21 as one end and a front end of the shaft 21 as the other end are supported by a rear end side bearing (not shown) and a front end side bearing (not shown), respectively.

The inverter 3 is a controller that controls driving of the motor 2. The inverter 3 is provided, for example, in a flat rectangular parallelepiped. Further, the inverter 3 is provided in a manner of overlapping with the motor 2 along the axial direction of the shaft 21. In the present embodiment, the inverter 3 is located right above the motor 2, for example.

The inverter 3 is provided such that a longitudinal direction thereof coincides with the axial direction of the shaft 21, a flat height direction coincides with an arrangement direction in which the motor 2 and the inverter 3 are arranged, and for example, a width direction is orthogonal to the longitudinal direction and the height direction.

The gear box 4 is a driving force transmission mechanism that transmits the driving force output from the motor 2 to a drive shaft (not shown) of a wheel. The gear box 4 is provided in a manner of being arranged along the motor 2 and the axial direction of the shaft 21. Specifically, the gear box 4 is connected to a rear end of the motor 2 in a manner of being adjacent to a rear end of the shaft 21.

The gear box 4 includes a gear group 41 that transmits rotation of the shaft 21 to the drive shaft of the wheel, a casing 42 that accommodates the gear group 41, and a catch tank 43 that catches oil slung up by the gear group 41.

The gear group 41 includes a plurality of gears 411 that mesh with each other. The casing 42 is connected to a rear end of a motor accommodating portion 51 (see FIG. 2), which will be described later, of the housing member 5 by, for example, bolting. The catch tank 43 opens upward so as to easily catch the oil scraped up by the gear group 41. In a state in which the casing 42 and the housing member 5 are connected to each other, the catch tank 43 communicates with a rear end as one end of an oil passage 54, which will be described later, of the housing member 5. Further, the catch tank 43 guides the caught oil to the oil passage 54.

The housing member 5 is an accommodating member that accommodating both the motor 2 and the inverter 3. The housing member 5 will be described in detail later.
(Configuration of Housing Member)
Next, the housing member 5 will be described in detail with reference to FIGS. 1 and 2.

Figure 2:
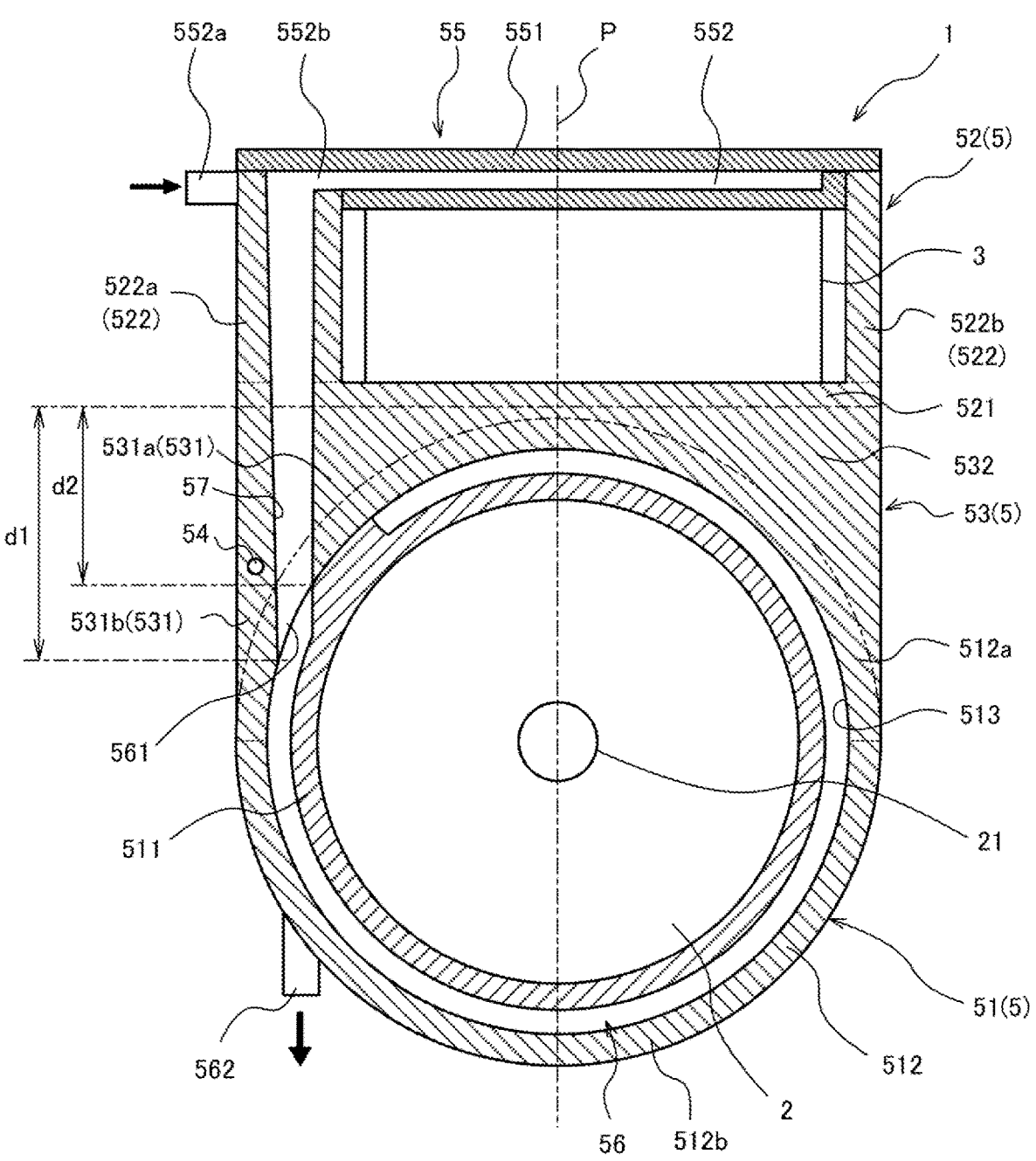
FIG. 2 is an enlarged cross-sectional view taken along a line II-II in FIG. 1.

FIG. 2 is an enlarged cross-sectional view taken along a line II-II in FIG. 1.

As shown in FIGS. 1 and 2, the housing member 5 includes the motor accommodating portion 51, an inverter accommodating portion 52, a coupling portion 53, the oil passage 54, an inverter refrigerant circuit portion 55, a motor refrigerant circuit portion 56, and a refrigerant flow path 57 (flow path through which a refrigerant flows).

The motor accommodating portion 51 is an accommodating portion that accommodates the motor 2. The motor accommodating portion 51 includes an inner cylinder 511 as a cylinder member surrounding an outer peripheral side of the motor 2, and an outer cylinder 512 surrounding an outer peripheral side of the inner cylinder 511.

The inner cylinder 511 is provided in a cylindrical shape. Similarly, the outer cylinder 512 is provided in a cylindrical shape. The inner cylinder 511 and the outer cylinder 512 are connected to each other by a connection portion (not shown) at end portions of the inner cylinder 511 and the outer cylinder 512. The outer cylinder 512 includes a coupling region 512a coupled to the coupling portion 53 and a non-coupling region 512b not coupled to the coupling portion 53. The coupling region 512a and the non-coupling region 512b are formed in a semicircular shape corresponding to each other in a front view.

An annular clearance 513 is formed between the outer peripheral side of the inner cylinder 511 and an inner peripheral side of the outer cylinder 512.

In the present embodiment, the inner cylinder 511 and the outer cylinder 512 are both formed in a perfect annular shape in the front view, but the present invention is not limited thereto, and for example, at least one of the inner cylinder 511 and the outer cylinder 512 may be formed in a notched annular shape in the front view. In this case, an inner peripheral side of at least one of the inner cylinder 511 and the outer cylinder 512 and an outer peripheral side thereof are communicated with each other by a notch.

The inverter accommodating portion 52 is an accommodating portion that accommodates the inverter 3. Specifically, the inverter accommodating portion 52 supports the inverter 3 such that an outside of the inverter 3 is surrounded. Further, the inverter accommodating portion 52 is provided outside the motor accommodating portion 51 in a radial direction of the motor 2. The inverter accommodating portion 52 includes a bottom wall 521 formed in a concave shape in the front view and coupled to the coupling portion 53, and two side walls 522 erected on the bottom wall 521 in a manner of facing each other.

The coupling portion 53 is a coupling portion that couples the motor accommodating portion 51 and the inverter accommodating portion 52. The coupling portion 53 is provided in an arch shape obtained by removing a semicircle from a rectangle in the front view. Further, the coupling portion 53 includes a first coupling portion 531 and a second coupling portion 532 that are divided by a virtual line P passing through an axis of the shaft 21 of the motor 2 and extending along a direction in which the motor 2 and the inverter 3 are arranged. The first coupling portion 531 and the second coupling portion 532 are formed symmetrically with respect to the virtual line P.

The first coupling portion 531 includes an inner region 531a serving as an inner side of the refrigerant flow path 57 adjacent to the second coupling portion 532 and an outer region 531b serving as an outer side of the refrigerant flow path 57 separated from the second coupling portion 532, due to the refrigerant flow path 57 passing through the first coupling portion 531 and one side wall 522a. Each of the inner region 531a and the outer region 531b is an adjacent region that is adjacent to the refrigerant flow path 57.

The motor accommodating portion 51, the inverter accommodating portion 52, and the coupling portion 53 are integrally formed. As described above, the motor accommodating portion 51 in which the motor 2 is accommodated and the inverter accommodating portion 52 in which the inverter 3 is accommodated are integrally formed together with the coupling portion 53 that couples the motor accommodating portion 51 and the inverter accommodating portion 52 to each other, and thus it is possible to achieve a decrease in size and weight of the housing member 5. In the present embodiment, the motor accommodating portion 51, the inverter accommodating portion 52, and the coupling portion 53 are integrally cast by a material containing aluminum, a magnesium alloy, or the like.

The oil passage 54 is an oil passage that allows the gear box 4 (specifically, the catch tank 43) on an upstream side to communicate with a front end side of the motor 2 on a downstream side. That is, in the oil passage 54, the rear end as the one end communicates with the catch tank 43, and a front end as the other end communicates with a communication oil passage (not shown) formed on the front end side of the motor 2. The communication oil passage allows the front end of the oil passage 54 to communicate with the front end side bearing, and supplies the oil from the oil passage 54 to the front end side bearing. Accordingly, the front end side bearing can be lubricated with the oil.

In the present embodiment, the oil is supplied from the oil passage 54 to the front end side bearing via the communication oil passage, but is not limited thereto, and may be supplied from the oil passage to the shaft 21 of the motor 2 via the communication oil passage, for example. In this case, the shaft 21 can be lubricated with the oil. Further, the oil supplied to the shaft 21 returns to the gear box 4.

The oil passage 54 is formed in the coupling portion 53 (specifically, the first coupling portion 531 of the coupling portion 53) in a manner of extending along an axial direction of the motor 2. Accordingly, since the coupling portion 53 that couples the motor accommodating portion 51 and the inverter accommodating portion 52 is effectively used as an oil passage forming space of the oil passage 54, it is not necessary to separately provide a pipe in which the oil passage is formed, and the housing member 5 can be reduced in size and weight and can be simplified.

Further, the oil passage 54 is formed to be inclined. Specifically, the oil passage 54 is inclined along a vertical direction (up-down direction) so as to descend from a rear end side toward a front end side. Accordingly, the oil can smoothly flow from the catch tank 43 to a coupling oil passage.

The inverter refrigerant circuit portion 55 is a circuit that cools the inverter 3. When the drive unit 1 is operated, the inverter 3 can be cooled by circulating cooling water as the refrigerant in the inverter refrigerant circuit portion 55.

The inverter refrigerant circuit portion 55 is provided at tip ends of the two side walls 522 in the inverter accommodating portion 52. Further, the inverter refrigerant circuit portion 55 includes a base panel 551 coupled to the tip ends of the side walls 522 by the bolting, and an inverter refrigerant flow path 552 provided on an opposite surface of the base panel 551 facing the bottom wall 521 of the inverter accommodating portion 52.

The inverter refrigerant flow path 552 is provided over the entire base panel 551 in a manner of meandering from a rear end side of the base panel 551 near the gear box 4 toward a front end side of the base panel 551. Further, the inverter refrigerant flow path 552 has an inflow port 552a formed on the rear end side of the base panel 551 in a manner of penetrating the one side wall 522a, and an inverter refrigerant flow path side communication port 552b formed on the front end side of the base panel 551 in a manner of communicating with the refrigerant flow path 57.

Further, the inverter 3 (in particular, an upper region of the inverter 3) can be efficiently cooled by causing the cooling water to flow from the inflow port 552a and causing the cooling water to flow out from the inverter refrigerant flow path side communication port 552b via the meandering inverter refrigerant flow path 552.

In the present embodiment, the inverter refrigerant circuit portion 55 is provided above the inverter 3, but is not limited thereto, and may be provided in a tubular shape surrounding an outer peripheral side of the inverter 3, for example. In this case, the entire inverter 3 can be efficiently cooled by the inverter refrigerant circuit portion 55. In addition, the coupling portion 53 can be efficiently cooled by the inverter refrigerant circuit portion 55.

The motor refrigerant circuit portion 56 is a circuit that cools the motor 2. When the drive unit 1 is operated, the motor 2 can be cooled by circulating the cooling water into the motor refrigerant circuit portion 56.

The motor refrigerant circuit portion 56 is provided on the outer peripheral side of the inner cylinder 511 of the motor accommodating portion 51. Specifically, the motor refrigerant circuit portion 56 is a spiral water jacket provided in the clearance 513 located between the outer peripheral side of the inner cylinder 511 and the inner peripheral side of the outer cylinder 512. Further, the motor refrigerant circuit portion 56 includes a motor refrigerant circuit portion side communication port 561 formed on a front end side of the motor accommodating portion 51 in a manner of communicating with the refrigerant flow path 57, and an outflow port 562 formed on a rear end side of the motor accommodating portion 51.

Further, the entire motor 2 can be efficiently cooled by causing the cooling water to flow from the motor refrigerant circuit portion side communication port 561 and causing the cooling water to flow out from the outflow port 562 via the spiral motor refrigerant circuit portion 56.

Since a part of the spiral motor refrigerant circuit portion 56 is also provided on an inner peripheral side of the coupling region 512a of the outer cylinder 512, the coupling region 512a and the coupling portion 53 can be cooled by the cooling water flowing through the motor refrigerant circuit portion 56. As a result, the oil passage 54 formed in the coupling portion 53 and a lower region of the inverter 3 that abuts against the coupling portion 53 can be cooled over the axial direction of the shaft 21, so that both the oil passage 54 and the entire inverter 3 can be cooled more efficiently.

Further, a communication flow path (not shown) that allows the inflow port 552a to communicate with the outflow port 562 may be provided. In this case, a cooling device (not shown) that cools water is provided in the communication flow path. Accordingly, since the water can be circulated and used, the drive unit 1 can be efficiently cooled.

The refrigerant flow path 57 is a flow path that causes the inverter refrigerant circuit portion 55 to communicate with the motor refrigerant circuit portion 56. Specifically, the refrigerant flow path 57 is formed through the coupling portion 53 and the one side wall 522a of the inverter refrigerant accommodating portion 52 such that the inverter refrigerant flow path side communication port 552b of the inverter refrigerant circuit portion 55 (specifically, the inverter refrigerant flow path 552) provided in the inverter accommodating portion 52 communicates with the motor refrigerant circuit portion side communication port 561 of the motor refrigerant circuit portion 56 provided in the motor accommodating portion 51.

In this way, since the refrigerant flow path 57 allows the inverter refrigerant circuit portion 55 and the motor refrigerant circuit portion 56 to communicate with each other, the cooling water can be circulated to the motor refrigerant circuit portion 56 via the refrigerant flow path 57 by supplying the cooling water only to the inverter refrigerant circuit portion 55. As a result, it is not necessary to construct a system that supplies the cooling water to each of the inverter refrigerant circuit portion 55 and the motor refrigerant circuit portion 56, and it is possible to efficiently cool both the motor 2 and the inverter 3.

Since the coupling portion 53 that couples the motor accommodating portion 51 and the inverter accommodating portion 52 is effectively used as a flow path forming space of the refrigerant flow path 57, it is not necessary to separately provide a pipe in which the refrigerant flow path is formed, and the housing member 5 can be reduced in size and weight and can be simplified.

Further, since the refrigerant flow path 57 passes through the coupling portion 53, the oil passage 54 formed in the coupling portion 53 can be similarly efficiently cooled by the cooling water flowing through the refrigerant flow path 57.

As described above, since the refrigerant flow path 57 passes through the one side wall 522a, the one side wall 522a is preferably provided in a manner of being thicker than the other side wall 522b that faces the one side wall 522a.

The oil passage 54 and the refrigerant flow path 57 are formed in the first coupling portion 531. That is, the oil passage 54 passes through the first coupling portion 531 (adjacent region) adjacent to the refrigerant flow path 57. Accordingly, the oil passage 54 can be more efficiently cooled as compared with a case in which the oil passage 54 is formed in one of the first coupling portion 531 and the second coupling portion 532 and the refrigerant flow path 57 is formed in the other of the first coupling portion 531 and the second coupling portion 532. In the present embodiment, the oil passage 54 and the refrigerant flow path 57 are formed in the first coupling portion 531, but are not limited thereto, and may be formed in the second coupling portion 532, for example.

The outer region 531b of the coupling portion 53 is located outside the refrigerant flow path 57. Accordingly, as compared with the case in which the oil passage 54 is located in the inner region 531a, the oil passage 54 can be moved away from the motor 2 and the inverter 3 which are relatively hot, so that the oil passage 54 can be cooled more efficiently. Further, since air cooling on a surface of the housing member 5 can also be used, the oil passage 54 can be cooled more efficiently.

In the vertical direction, a minimum width d2 of the outer region 531b is larger than a maximum width d1 of the inner region 531a. Further, when the oil passage 54 inclined along the vertical direction is located in the outer region 531b, an inclination angle of the oil passage 54 can be set to be larger than that in the case in which the oil passage 54 is located in the inner region 531a. As a result, the oil can flow more smoothly from the catch tank 43 to the coupling oil passage.

(Functions and Effects)

Next, a main operation and effect of the present embodiment will be described.

(1) The housing member 5 (component) according to the present embodiment includes: the inverter accommodating portion 52 that accommodates the inverter 3; the coupling portion 53 that couples the motor accommodating portion 51 and the inverter accommodating portion 52 and is integrally formed with the motor accommodating portion 51 and the inverter accommodating portion 52; and the oil passage 54 that is formed in the coupling portion 53 in a manner of extending along the axial direction of the motor 2.

According to this configuration, the motor accommodating portion 51 in which the motor 2 is accommodated and the inverter accommodating portion 52 in which the inverter 3 is accommodated are integrally formed together with the coupling portion 53 that couples the motor accommodating portion 51 and the inverter accommodating portion 52 to each other, and thus it is possible to achieve the decrease in size and weight of the housing member 5. Further, since the coupling portion 53 that couples the motor accommodating portion 51 and the inverter accommodating portion 52 is effectively used as the oil passage forming space of the oil passage 54, it is not necessary to separately provide the pipe in which the oil passage is formed, and the housing member 5 can be reduced in size and weight and can be simplified.

(2) The housing member 5 (component) further includes the refrigerant flow path 57 passing through the coupling portion 53.

According to this configuration, the oil passage 54 formed in the coupling portion 53 can be similarly efficiently cooled by the cooling water flowing through the refrigerant flow path 57. Since the coupling portion 53 that couples the motor accommodating portion 51 and the inverter accommodating portion 52 is effectively used as the flow path forming space of the refrigerant flow path 57, it is not necessary to separately provide the pipe in which the refrigerant flow path is formed, and the housing member 5 can be reduced in size and weight and can be simplified.

(3) The oil passage 54 passes through the first coupling portion 531 (adjacent region) adjacent to the refrigerant flow path 57.

According to this configuration, the oil passage 54 can be more efficiently cooled as compared with the case in which the oil passage 54 is formed in one of the first coupling portion 531 and the second coupling portion 532 and the refrigerant flow path 57 is formed in the other of the first coupling portion 531 and the second coupling portion 532.

(4) The outer region 531b (adjacent region) of the first coupling portion 531 is located outside the refrigerant flow path 57.

According to this configuration, as compared with the case in which the oil passage 54 is located in the inner region 531a, the oil passage 54 can be moved away from the motor 2 and the inverter 3 which are relatively hot, so that the oil passage 54 can be cooled more efficiently. Further, since the air cooling on the surface of the housing member 5 can also be used, the oil passage 54 can be cooled more efficiently.

(5) The motor accommodating portion 51 includes the inner cylinder 511 (cylinder member) surrounding the outer peripheral side of the motor 2, the housing member 5 (component) further includes the motor refrigerant circuit portion 56 provided on the outer peripheral side of the inner cylinder 511 (cylinder member), and the inverter refrigerant circuit portion 55 provided in the inverter accommodating portion, and the motor refrigerant circuit portion 56 and the inverter refrigerant circuit portion 55 communicate with each other via the refrigerant flow path 57.

According to this configuration, since the refrigerant flow path 57 allows the inverter refrigerant circuit portion 55 and the motor refrigerant circuit portion 56 to communicate with each other, the cooling water can be circulated to the motor refrigerant circuit portion 56 via the refrigerant flow path 57 by supplying the cooling water only to the inverter refrigerant circuit portion 55. As a result, it is not necessary to construct the system that supplies the cooling water to each of the inverter refrigerant circuit portion 55 and the motor refrigerant circuit portion 56, and it is possible to efficiently cool both the motor 2 and the inverter 3.

(6) The oil passage 54 is inclined.

According to this configuration, the oil can smoothly flow from the catch tank 43 to the coupling oil passage.

(7) The housing member 5 (component) further includes the refrigerant flow path 57 passing through the coupling portion 53, and the oil passage 54 is located in the outer region 531b (outside the refrigerant flow path 57) while being inclined.

According to this configuration, the oil passage 54 formed in the coupling portion 53 can be similarly efficiently cooled by the cooling water flowing through the refrigerant flow path 57. Since the coupling portion 53 that couples the motor accommodating portion 51 and the inverter accommodating portion 52 is effectively used as the flow path forming space of the refrigerant flow path 57, it is not necessary to separately provide the pipe in which the refrigerant flow path is formed, and the housing member 5 can be reduced in size and weight and can be simplified.

Further, as compared with the case in which the oil passage 54 is located in the inner region 531a, the oil passage 54 can be moved away from the motor 2 and the inverter 3 which are relatively hot, so that the oil passage 54 can be cooled more efficiently.

Further, when the oil passage 54 inclined along the vertical direction is located in the outer region 531b, the inclination angle of the oil passage 54 can be set to be larger than that in the case in which the oil passage 54 is located in the inner region 531a. As a result, the oil can flow more smoothly from the catch tank 43 to the coupling oil passage.

(8) The drive unit 1 (component) according to the present embodiment further includes the motor 2 accommodated in the motor accommodating portion 51, and the inverter 3 accommodated in the inverter accommodating portion 52.

According to this configuration, it is possible to achieve decrease in size and weight of the entire drive unit 1.

(Modification)

Next, the drive unit 1 according to a modification will be described with reference to FIG. 3. In the present modification, the description of the same points as those of the above-described embodiment will be omitted, and differences from the above-described embodiment will be mainly described.

Figure 3:
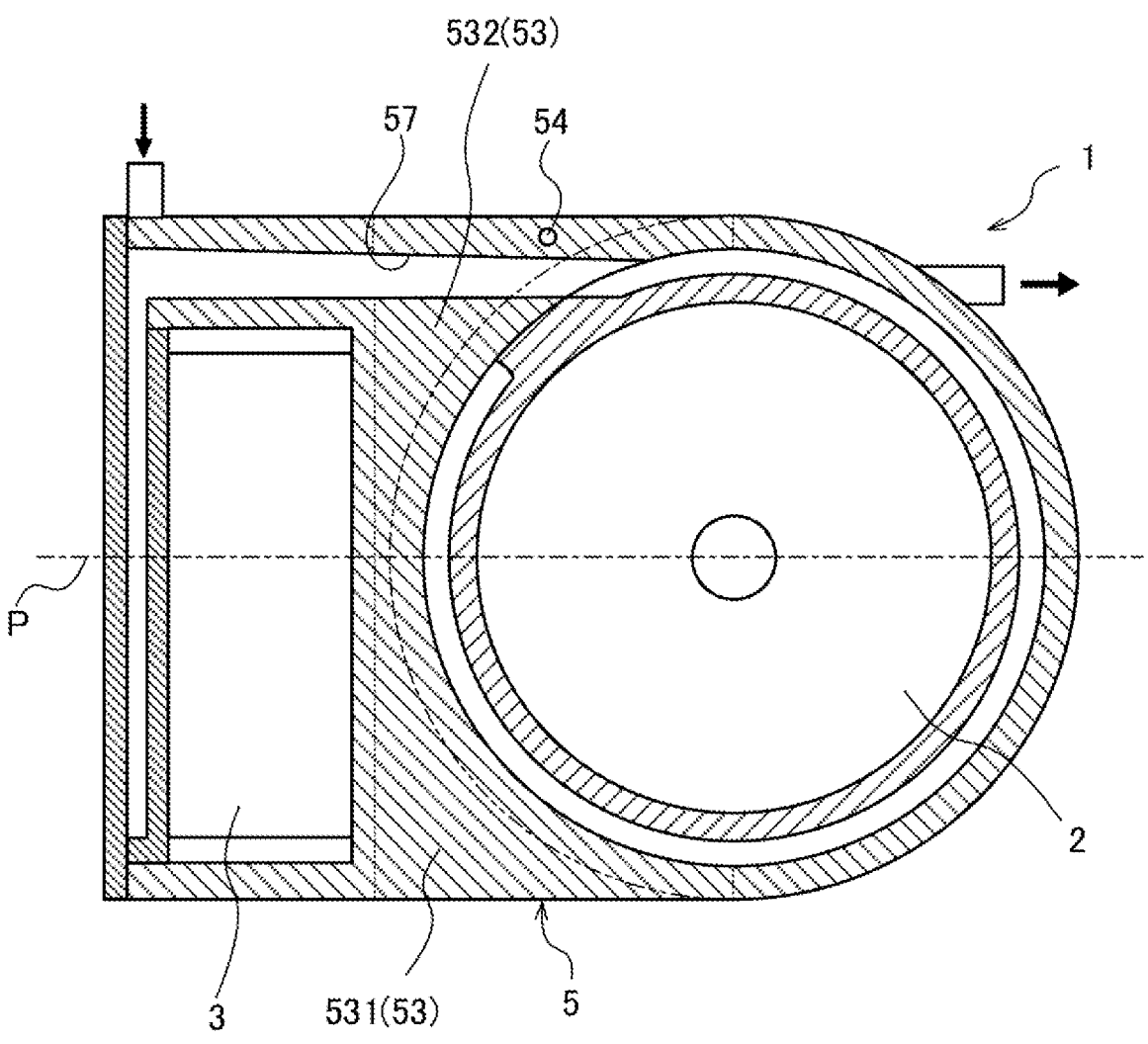
FIG. 3 is a schematic configuration diagram showing a drive unit according to a modification.

FIG. 3 is a schematic configuration diagram showing the drive unit 1 according to the modification.

In the above-described embodiment, the drive unit 1 is provided such that the motor 2 and the inverter 3 are arranged along a vertical direction, but is not limited thereto, and for example, the drive unit 1 may be provided such that the motor 2 and the inverter 3 are arranged along a horizontal direction (left-right direction) as shown in FIG. 3. In this case, the oil passage 54 and the refrigerant flow path 57 are not formed in the first coupling portion 531 but in the second coupling portion 532.

As shown in FIG. 3, the oil passage 54 is located outside the refrigerant flow path 57. Accordingly, as compared with a case in which the oil passage 54 is located inside the refrigerant flow path 57, the oil passage 54 can be moved away from the motor 2 and the inverter 3 which are relatively hot, so that the oil passage 54 can be cooled more efficiently.

In the present modification, the oil passage 54 is located outside the refrigerant flow path 57, but the present invention is not limited to this, and may be located inside the refrigerant flow path 57, for example. In this case, as compared with the case in which the oil passage 54 is located outside the refrigerant flow path 57, the inclination angle of the oil passage 54 can be set to be larger. As a result, the oil can flow more smoothly from the catch tank 43 to the coupling oil passage.

Although the embodiments of the present invention have been described above, the embodiments merely exemplify some of application examples of the present invention and do not intend to limit the technical scope of the present invention to the specific configurations of the embodiments.

DESCRIPTION OF REFERENCE SIGNS

1 drive unit
2 motor
3 inverter
5 housing member (component)
51 motor accommodating portion
52 inverter accommodating portion
53 coupling portion
54 oil passage
55 inverter refrigerant circuit portion
56 motor refrigerant circuit portion
57 refrigerant flow path
511 inner cylinder (cylinder member)
531 first coupling portion
531*a* inner region (inside of refrigerant flow path)
531*b* outer region (outside of refrigerant flow path)
532 second coupling portion The present application claims a priority of Japanese Patent Application No. 2021-037139 filed with the Japan Patent Office on Mar. 9, 2021, all the contents of which are hereby incorporated by reference.

The invention claimed is:

1. A component comprising:
a motor accommodating portion that accommodates a motor;
an inverter accommodating portion that accommodates an inverter provided outside the motor in a radial direction of the motor;
a coupling portion that couples the motor accommodating portion and the inverter accommodating portion and is integrally formed with the motor accommodating portion and the inverter accommodating portion;
an oil passage that supplies lubricating oil and is formed in the coupling portion in a manner of extending along an axial direction of the motor; and
a refrigerant flow path that passes through the coupling portion, wherein the oil passage passes through an adjacent region that is adjacent to the refrigerant flow path,
the coupling portion is provided in an arch shape obtained by removing a semicircle from a rectangle in a front view and includes a first coupling portion and a second coupling portion that are divided by a virtual line passing through an axis of a shaft of the motor and extending along a direction in which the motor and the inverter are arranged, and
the oil passage and the refrigerant flow path are both formed together in either the first coupling portion or the second coupling portion, so as to avoid the virtual line.

2. The component according to claim 1, wherein the adjacent region is located outside the refrigerant flow path.

3. The component according to claim 1, wherein the motor accommodating portion includes a cylinder member surrounding an outer peripheral side of the motor,
the component further comprises a motor refrigerant circuit portion provided on an outer peripheral side of the cylinder member, and an inverter refrigerant circuit portion provided in the inverter accommodating portion, and
the motor refrigerant circuit portion and the inverter refrigerant circuit portion communicate with each other via the refrigerant flow path.

4. The component according to claim 1, wherein the oil passage is inclined.

5. The component according to claim 1, wherein the oil passage is located outside the refrigerant flow path while being inclined.

6. The component according to claim 1, further comprising:
the motor that is accommodated in the motor accommodating portion; and
the inverter that is accommodated in the inverter accommodating portion.

* * * * *